April 30, 1968 GENICHI KAMOSHITA ET AL 3,380,812

SINTERED PALLADIUM MATERIALS FOR ELECTRIC CONTACT

Filed Aug. 4, 1966

United States Patent Office 3,380,812
Patented Apr. 30, 1968

3,380,812
SINTERED PALLADIUM MATERIALS FOR ELECTRIC CONTACT

Genichi Kamoshita, Koganei-shi, Mikio Hirano, Tokyo, Junko Shiba, Fuchu-shi, and Nobuhiro Hara, Tokyo, Japan, assignors to Hitachi, Ltd., Tokyo, Japan, a corporation of Japan Filed Aug. 4, 1966, Ser. No. 570,372
Claims priority, application Japan, Aug. 13, 1965, 40/48,969
2 Claims. (Cl. 29—182.5)

ABSTRACT OF THE DISCLOSURE

The present disclosure relates to sintered materials which are used as an electrical contact in an organic gas atmosphere, said materials comprising palladium and an inorganic lead compound present in an amount sufficient to diminish the catalytic action of the palladium. The catalytic action of the palladium converts the organic gas into organic substances which deposit on the electrical contact increasing its resistance. Palladium electrical contacts containing inorganic lead compounds such as lead oxide and lead sulfide possess a substantially diminished catalytic action.

The present invention relates to a material for electric contact comprising palladium and from 0.1 to 10% by weight of lead compounds, such as lead sulfide and lead monoxide, added thereto either independently or in combination for diminishing the catalytic action of the palladium.

In general, when an electric contact, which is made of palladium, is made or broken in an organic gas atmosphere, an organic substance (brown powder) is deposited on the contact surface, resulting in poor contact performance due to increasing contact resistance. In order to avoid such drawback, it has heretofore been practiced to clean the contact surface thoroughly or to apply a gold plating on said contact surface.

However, the former method of cleaning the contact surface is troublesome, while the latter method of plating the contact surface with gold has the drawback that it cannot be employed unconditionally from economic point of view.

As a result of various experiments conducted with a view to detect the cause of the organic substance depositing on the contact surface, the present inventors have discovered that the deposition of such substance was caused by the catalytic action of palladium, and consequently arrived at the conclusion that the formation of such organic substance could be checked by the addition to palladium of some compounds which are capable of diminishing the catalytic action of palladium. On the basis of this conclusion, it has been discovered further that lead compounds, particularly lead sulfide and lead monoxide, are effective as additives for the purpose described.

The present invention has been achieved based on this discovery. Namely, the material for electric contact of the present invention is produced either by sintering palladium at a temperature in the range from 600° to 1050° C. with the addition of from 0.1 to 10% by weight of lead sulfide or lead monoxide powder, or by blending from 0.1 to 10% by weight of lead sulfide or lead monoxide in molten palladium, with the subsequent freezing.

The effect of the admixed lead sulfide or lead monoxide increases as the sintering temperature is elevated.

An electric contact, which was produced using a material of the present invention, was subjected to friction in an atmosphere of organic gas, such as benzene, for 5 hours at a contact pressure of 30 g., a rubbing frequency of 3000 c.p.m. and a rubbing distance of 0.2 mm. The result was that the amount of the organic substance formed on the contact surface was less than about $\frac{1}{10}$ that in the case of electric contact made of pure palladium or was substantially the same as that in the case of electric contact whose surface was previously plated with gold.

Figure 1:
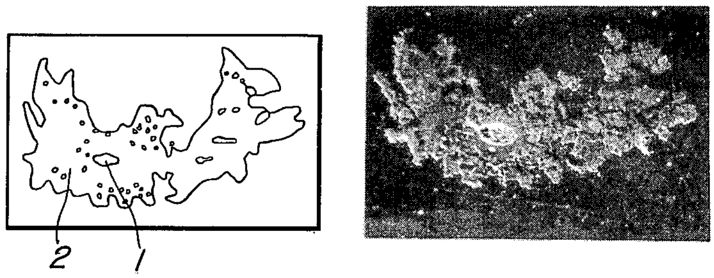
Figure 2:
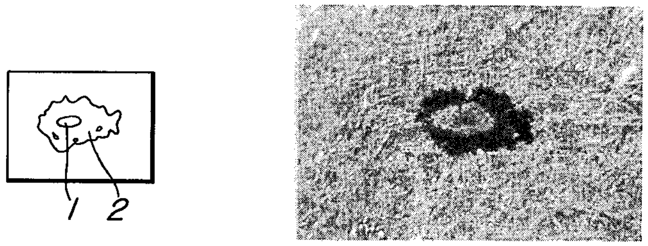
Figure 3:
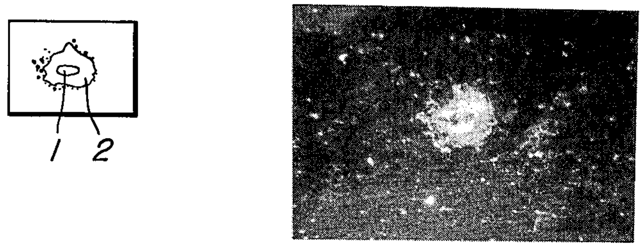

The present invention will be described in further detail hereinafter with reference to the accompanying drawings, in which:

FIGURE 1 is a set of 20× photographic pictures showing the organic substance formed on the surface of an electric contact made of palladium metals, after operation in an organic vapor, reference numeral 1 indicating the electric contact and reference numeral 2 indicating the organic substance formed on the contact surface;

FIGURE 2 is a set of photographic pictures in enlargement at the same magnification as FIGURE 1, illustrating the organic substance formed on the surface of a palladium contact with a gold plating, after operation in the organic vapor; and FIGURE 3 is a set of photographic pictures in enlargement at the same magnification as FIGURE 1, illustrating the organic substance formed on the surface of an electric contact made of a material of the present invention, after operation in the organic vapor.

Referring now to FIG. 1, an electric contact made of pure palladium, whose surface was previously polished by means of a buffer, was rubbed for 5 hours in a benzene atmosphere at a contact pressure of about 30 g., a rubbing frequency of 3000 c.p.m. and a rubbing distance of 0.2 mm. The organic substance formed on the contact surface 1 is indicated generally at 2 at 20× magnification. In FIGURE 2, there is shown the organic substance at the same magnification as FIG. 1, which was formed on the surface of a palladium contact with a gold plating, after rubbing said surface under the same conditions as in FIG. 1. FIG. 3 shows in enlargement at the same magnification as FIG. 1 the organic substance formed on the surface of an electric contact, which was made of a material of the present invention consisting of palladium and 1% by weight of lead sulfide added thereto, after rubbing said surface under the same conditions as in FIG. 1.

Experiments conducted with a varying amount of lead sulfide or lead monoxide blended in palladium have proved that the effect produced by the addition of these compounds is not varied by whether they are blended independently or in combination, and further that a content of these compounds below 0.1% by weight of palladium is not sufficient enough to obtain the desired effect, while on the other hand, a content of the same above 10% by weight of palladium would result in an excessive contact resistance causing the resistance value of the electric contact to deviate from a desired value and is, therefore, not desirable, though the object of supressing the organic substance formation could be attained. In this view, the content of the aforementioned lead compounds in palladium is preferably from 0.1 to 10% by weight of palladium as described previously.

As is obvious from the accompanying photographic pictures, it is possible, according to the present invention, (1) to check the formation of organic substance and thereby to prevent defective contact between electric contacts, (2) to improve the friction-resistant and wear-resistant properties of the electric contact due to increasing hardness, and (3) to provide an electric contact at a lower cost than conventional electric contacts with gold plating. As such, the present invention is of great industrial advantage.

In practicing the present invention, the contact resistance is admittedly increased somewhat due to the addition of lead sulfide or lead monoxide. However, such an increase in contact resistance may be cancelled by the addition of silver.

What is claimed is:

1. A sintered material used as an electric contact which consists essentially of palladium and about 0.1 to 10% by weight of at least one inorganic lead compound selected from the group consisting of lead oxide and lead sulfide, said lead compound being present in an amount sufficient to diminish the catalytic action of the palladium.

2. A process for producing a sintered material used as an electric contact which consists essentially of blending palladium powder with about 0.1 to 10% by weight of at least one inorganic lead compound selected from the group consisting of lead oxide and lead sulfide and sintering the resultant mixture at a temperature of about 600° C. to 1050° C.

References Cited

UNITED STATES PATENTS

| | | | |
|---|---|---|---|
| 2,057,604 | 10/1936 | Zickrick | 252—514 |
| 2,736,830 | 2/1956 | Savage | 252—514 |
| 2,924,540 | 2/1960 | D'Andrea | 252—514 |
| 3,207,706 | 9/1965 | Hoffman | 252—514 |

BENJAMIN R. PADGETT, *Primary Examiner.*

L. DEWAYNE RUTLEDGE, *Examiner.*

R. L. GRUDZIECKI, *Assistant Examiner.*